US006871195B2

(12) United States Patent
Ryan et al.

(10) Patent No.: US 6,871,195 B2
(45) Date of Patent: Mar. 22, 2005

(54) METHOD AND SYSTEM FOR REMOTE ELECTRONIC MONITORING AND MENTORING OF COMPUTER ASSISTED PERFORMANCE SUPPORT

(75) Inventors: Michael Ryan, Bridgewater, NJ (US); Munish Mehra, Gaithersburg, MD (US); Michael Wizemann, Bridgewater, NJ (US)

(73) Assignee: E-ProMentor, Bridgewater, NJ (US)

( * ) Notice: Subject to any disclaimer, the term of this patent is extended or adjusted under 35 U.S.C. 154(b) by 634 days.

(21) Appl. No.: 09/950,793

(22) Filed: Sep. 13, 2001

(65) Prior Publication Data

US 2003/0140021 A1 Jul. 24, 2003

Related U.S. Application Data

(60) Provisional application No. 60/232,220, filed on Sep. 13, 2000.

(51) Int. Cl.[7] .......................... G06F 17/00; G09B 19/00
(52) U.S. Cl. ........................................ 706/46; 434/118
(58) Field of Search ............................. 706/46; 434/118

(56) References Cited

U.S. PATENT DOCUMENTS

| | | | |
|---|---|---|---|
| 4,176,470 A | 12/1979 | Fosner et al. ................ 35/22 A |
| 4,358,273 A | 11/1982 | Yamamoto ................... 434/201 |
| 5,002,491 A | 3/1991 | Abrahamson et al. ....... 434/322 |
| 5,211,563 A | 5/1993 | Haga et al. .................. 434/322 |
| 5,372,507 A | 12/1994 | Goleh ......................... 434/118 |
| 5,485,369 A * | 1/1996 | Nicholls et al. ................ 705/9 |
| 5,496,177 A | 3/1996 | Collia et al. ................ 434/118 |
| 5,597,312 A | 1/1997 | Bloom et al. ............... 434/362 |
| 5,630,020 A | 5/1997 | Makram-Ebeid ............. 706/25 |
| 5,655,086 A | 8/1997 | Jury et al. ...................... 705/9 |
| 5,788,508 A | 8/1998 | Lee et al. .................... 434/350 |
| 5,823,781 A | 10/1998 | Hitchcock et al. .......... 434/118 |
| 5,864,480 A | 1/1999 | Ladd ............................ 700/83 |
| 5,867,799 A | 2/1999 | Lang et al. .................... 707/1 |
| 5,870,731 A | 2/1999 | Trif et al. ..................... 706/52 |
| 5,954,510 A | 9/1999 | Merrill, et al. .............. 434/236 |
| 5,957,699 A | 9/1999 | Peterson et al. ............ 434/350 |
| 5,963,663 A | 10/1999 | Tani ............................ 382/153 |
| 6,014,134 A | 1/2000 | Bell et al. .................... 345/329 |
| 6,029,156 A | 2/2000 | Lannert et al. ............... 706/11 |
| 6,029,159 A | 2/2000 | Zorba et al. .................. 706/47 |
| 6,032,141 A | 2/2000 | O'Connor, et al. ........... 706/45 |
| 6,047,261 A | 4/2000 | Siefert ......................... 705/11 |
| 6,062,862 A | 5/2000 | Koskinen .................... 434/107 |
| 6,077,085 A | 6/2000 | Parry et al. ................. 434/322 |
| 6,081,788 A | 6/2000 | Appleman et al. ........... 705/14 |
| 6,112,304 A | 8/2000 | Clawson ..................... 713/156 |
| 6,269,355 B1 * | 7/2001 | Grimse et al. ................ 706/46 |

* cited by examiner

Primary Examiner—George Davis
(74) Attorney, Agent, or Firm—Norris, McLaughlin & Marcus

(57) ABSTRACT

Method and system for computer assisted performance support include remote electronic monitoring and mentoring to provide for supervision, control and instruction of the worker while the worker performs directed tasks. Activity data representative of worker activities are collected at the work site and can be accessed by a supervisor located remote from the work site. The remote supervisor generates and transmits to the worker feedback based on the activity data. The remote supervisor can evaluate an activity trail of a worker's performance of directed tasks and development of skills through educational training to permit timely identification and correction of worker deficiencies. The ability of the remote supervisor to transmit feedback to the worker while the worker is performing directed tasks enhances rapid development of the worker's skills and workplace safety and productivity.

23 Claims, 2 Drawing Sheets

10 # METHOD AND SYSTEM FOR REMOTE ELECTRONIC MONITORING AND MENTORING OF COMPUTER ASSISTED PERFORMANCE SUPPORT

This application claims the benefit of provisional application No. 60/232,220, filed Sep. 13, 2000.

FIELD OF THE INVENTION

The present invention relates generally to method and system for computer assisted performance support and, more particularly, method and system for remote electronic monitoring and mentoring of computer assisted performance support to provide for supervisory input and task performance control.

BACKGROUND OF THE INVENTION

A business entity attempts to train its workers to perform their assigned tasks with optimal efficiency, speed and safety. The objective is to achieve optimal worker performance levels as rapidly and efficiently as possible. Each worker's knowledge, skill and judgment contribute to the safety of the workplace. In general, the greater the number of less skilled and less experienced workers in the workplace, the greater the chance for costly mistakes and workplace accidents.

It is well known that worker training is optimized by providing on-the-job support and supervision. There is a continuing need to improve worker access to support and supervision. Technology-based jobs are becoming increasingly more complex. In addition, rapid job turnover has caused even skilled workers to have to learn new, complex jobs quickly and also to learn quickly how to perform the jobs well.

In certain work environments, such as in production or regulated industries, workers need to be trained to perform repetitive, complex and structured ("RCS") tasks. Some examples of RCS tasks include manufacturing chemicals, performing regulated work such as governmental regulation, e.g., Environmental Protection Agency, directed jobs, setting up and conducting clinical studies, help desk staff, etc.

Often, a worker must understand the tasks to be performed and the purposes of each task to complete a work project successfully and efficiently. In such circumstances, simply providing a worker with a checklist of tasks to be performed is inadequate. Also, the success of worker training may depend on whether adequate support is available to the worker on-demand, for example, as the worker begins to perform or performs a required task.

Various computer assisted teaching tools are available to provide a worker with information and guidance as to how work tasks should be performed. See, for example, U.S. Pat. Nos. 5,823,781, 5,655,086, 5,864,480 and 6,047,261, incorporated by reference herein. Although these computer-based tools provide the worker with training and education, they do not guide the worker as to how and why to perform each task at the time the task is to be performed. Further, the tools do not permit the worker to receive supervisory input in the course of performing a series of work tasks, such as, for example, when performing one or more of a series of required tasks.

It is advantageous that a worker receive supervisory input, especially in the course of performing assigned tasks, to achieve the full benefits of mentoring. Mentoring, when properly implemented, provides a worker, in addition to training and education in the required tasks to be performed, with a supervisor's judgment and decision-making input as the worker performs the required tasks. In addition, it is also advantageous if the supervisor can learn of the worker's success or failure in completing each task and how such success or failure relates to the entire work project.

Many business entities encounter great difficulty in implementing mentoring in today's workplace. Often, there is a significant geographic distance separating the supervisor from the worker. Also, an entity might not always have sufficient personnel time or funds available to provide a supervisor who acts as a mentor for those less skilled in a given job. Therefore, lesser skilled workers are more likely to make errors that can be dangerous to themselves and others. Furthermore, without adequate mentoring, substantial time is lost in training workers to attain satisfactory and safe levels of quality performance. Also, productivity declines, which often causes financial losses to a business entity, and potentially unsafe conditions continue to arise.

Therefore, there exists a need for method and system for computer assisted performance support which provides, with relative ease and at minimal expense, that a worker can receive education, training and supervisory input while the worker is performing a directed task and that the directed tasks to be performed by the worker can be monitored and controlled.

SUMMARY OF THE INVENTION

In accordance with the present invention, method and system for remote electronic monitoring and mentoring of computer assisted performance support collects activity data representative of the actions that a worker performs at a work site and makes the activity data available for evaluation at the work site and remote from the work site. A supervisor of the worker located at or remotely from the work site, therefore, can evaluate worker performance of directed tasks and, as necessary, instruct, direct and control the worker in the course of the performance of the directed tasks to make timely corrections to and accelerate the training process. The electronic monitoring of the worker's actions permits the supervisor to mentor the worker on an as-needed basis and, preferably, simultaneously as the worker performs a directed task.

In a preferred embodiment, the system includes a work interface module and a remote interface module each having data processing, storage and transfer capabilities for implementing computer assisted performance support and mentoring software and software enabling communication between a worker and remotely located supervisor. The work and remote modules are integrated in the system in combination with an educational and training information module. The information module has data processing, storage and transfer capabilities that provide for download of information to a work module and upload of information from a remote module or other information source.

In a further preferred embodiment, computer software applications implemented in the work module direct a worker to perform predetermined tasks, educate and train the worker on the tasks to be performed, monitor the worker's performance of the tasks and use of educational and training information, store activity data representative of the monitored activities of the worker, transmit, preferably in real time, activity data to the remote module, control worker performance of tasks and receive, store and process data representative of supervisory input and task performance control instructions transmitted, preferably in real time, from the remote module. The remote module includes computer software applications that provide for receipt, storage and processing of activity data, generation and transmission to a work module of supervisory input and task control instructions and the performance of system administration operations.

In one preferred embodiment, the remote module includes a system administration tool that facilitates system updates at any remote module, work module and information module included in the system. The remote module also includes an activity evaluation tool that receives, stores and processes activity data transmitted from a work module. The evaluation tool also generates and transmits to a work module supervisory input and task control instructions. The work module includes a computer assisted learning ("CAL") tool that facilitates education and training of the worker and, preferably, permits the worker to decide for each task to be performed what, if any, additional educational and training information to access from the CAL tool itself, the information module or elsewhere. The work module also includes a work support tool that directs the worker to perform tasks, controls the performance of tasks by the worker and provides the worker with supervisory input transmitted from the remote module. The work module in addition includes a monitoring tool that stores, and transmits to the remote module, activity data representative of the tasks performed and any educational and training information accessed by the worker.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

Figure 1:
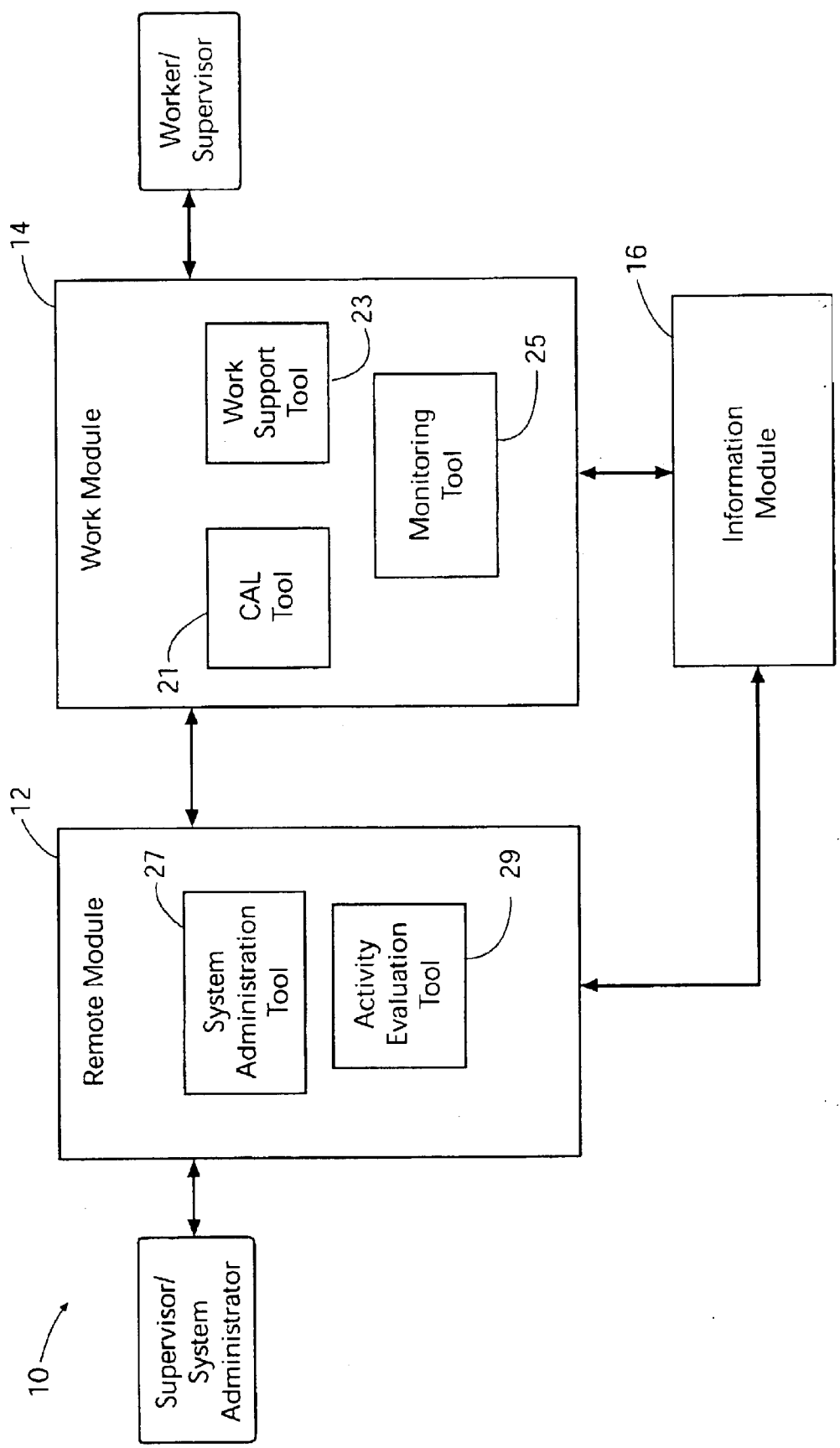
FIG. 1 is a block diagram of a computer assisted performance support system having remote electronic monitoring and mentoring features in accordance with one embodiment of the invention.

FIG. 1 shows in block diagram form an embodiment of a system 10 for remote electronic monitoring and mentoring of computer assisted performance support in accordance with a preferred embodiment of the present invention. The system 10 includes computer-based human interface modules each of which includes component tools that execute software programs to implement the computer assisted performance support and remote electronic monitoring and mentoring features of the present invention. The modules are integrated with one another through, for example, a separate module, a computer program or series of computer programs, to advantageously permit simultaneous education and training of workers, monitoring, reporting and evaluating of directed tasks performed by workers and control and direction of workers in the performance of the tasks.

It is to be understood that each of the component tools in the modules of the system 10 which is described below as performing data processing operations is a software module or, alternatively, a hardware module or a combined hardware/software module. In addition, each of the modules in the system 10 suitably contains a memory storage area, such as RAM, for storage of data and instructions for performing processing operations in accordance with the present invention. Alternatively, instructions for performing processing operations can be stored in hardware in one or more of the modules in the system 10.

Referring to FIG. 1, the system 10 includes a remote interface module 12, a work interface module 14 and an educational and training information database module 16 each of which is electronically linked or linkable to the other. In a preferred embodiment, the modules 12 and 14 in the system 10, and their respective users, are physically separated from one another. An end user at the work module 14 may constitute a worker performing directed tasks, or a supervisory person overseeing the tasks and who also can perform the directed tasks. An end user at the remote module 12 may constitute a supervisor of workers, or a system administrator responsible for maintaining and updating the system 10 computer programs and databases. It is to be understood that the system 10 may include a plurality of remote, work and information modules integrated with one another, such that several supervisors at respective remote modules may evaluate the work performed by many workers at one or more work modules and, as suitable, generate and transmit to a work module supervisory input and task performance control instructions.

The system 10 preferably utilizes client server architecture and is fully web enabled to permit constant, real time communication between or among the modules over secure intranets or extranets or other suitable communication networks. In one alternative embodiment, the system 10 is implemented using a plurality tier, and preferably, a three-tier architecture. In still a further embodiment, the system 10 is implemented as a fat client, a two-tier client server, a three-tier client, application server, database server or some other appropriate multi-tier architecture. The architecture is preferably modular and includes reusable components employing object-oriented methodology.

The system 10 may be implemented over various transport layers including telephone lines, wireless communications, private networks and public networks, such as the Internet. The remote or work module may constitute a desktop, laptop, personal digital assistant ("PDA"), cell phone or specialized device that may receive, store, process and transmit data. Each of the system modules may be stand alone or connected to other modules in the system via various transport layers. In a preferred embodiment, a work module is implemented on a laptop with a modem enabling access to a remote dial-up server or website to permit, for example, upload of system updates to the information module 16.

In a preferred embodiment, the system 10 is implemented using WAP/WML/WML-Script enabled cellular or non-cellular telephones and PDAs, such as the PALM PILOT, with wireless connectivity to a web server. Wireless devices included in the system may use BLUETOOTH, WAP, WML or other appropriate protocols and markup languages to communicate with one another and display information.

The inventive data processing, storage, transmission and reception features may be implemented and developed on such platforms as MICROSOFT WINDOWS, UNIX, LINUX, VISUAL BASIC, .NET, ACCESS, FOXPRO, JAVA, JAVA BEANS, JAVA SCRIPT, XML, etc. to permit modular development and efficient usage, especially for thin clients, i.e., electronic devices with minimal or no data storage or limited data processing capabilities. The modules of the system 10 also may be linked to data in databases and support commonly used databases, such as, ORACLE, SYBASE, ACCESS, SAS, SQL SERVER, NY SQK, FOXPRO, XML, ASCII, etc.

In a further preferred embodiment, the functionalities of the system 10 included in the modules 12, 14 and 16 are combined together into a computer program stored at a single device, such as a server, and a worker or supervisor can access the server remotely using a computer, laptop, PDA, etc., and perform system operations in accordance with the present invention. In another alternative embodiment, all of the functionalities of the inventive system 10 are included in each of the modules 12 and 14, which are electronically linked or linkable to each other.

Referring to FIG. 1, the work module 14 includes a computer assisted learning (CAL) tool 21 that displays educational and training information to the user on a conventional output or display device, such as a liquid crystal display screen or other graphical display, included in the module 14. The information displayed describes to the user, e.g., a worker, the "what," "when" (for example, in what sequence), "where," "how" and "why" concerning the directed tasks that must be performed to complete a work project. The CAL tool 21 also provides for worker self-testing and testing by supervisors from the remote module 12. Through the CAL tool 21, the worker can readily access reference materials relating to the work being performed, such as standard operating procedures and guidelines, which are stored in the CAL tool 21, or the information module 16 or may be found on the internet. The CAL tool 21 preferably includes an information database and searching tools that permit the worker to quickly find related words and concepts for a task being performed using hierarchical searching of the information database. The information database within the CAL tool 21 may be updated electronically, and preferably automatically, by public networks such as the Internet, wired or wireless telephone, wide area network (WAN), or diskettes such as ZIP, CD, etc. The CAL tool 21, for example, would permit a health worker, who is using the system 10 to complete a clinical study on a medical disease or condition, to search the CAL tool 21, the information module 16 or external sources such as the Internet for more information on the disease or condition that is the subject of the study.

In a preferred embodiment, the CAL tool 21 includes a training application on use of the inventive system 10 which itself constitutes a part of the education program for the worker.

The module 14 further includes a work support tool 23 that includes specific instructions directing the user to perform specific tasks. In a preferred embodiment, the work support tool 23 schedules worker tasks, leads the worker through the tasks one by one and instructs the worker to take the proper steps to record activities, which may include successes and failures of operations. The tool 23 further directs the worker how to make decisions, such as, for example, to determine whether an observation reportable, who needs to know, what corrective action must be taken, if any, how much time can elapse before the next step can be performed, what are the consequences of not making a timely correction, etc. The work support tool 23 processes the information available, such as the worker's success in completing a directed task, and then accordingly lists the next task to be completed.

In an alternative preferred embodiment, the tool 23 evaluates worker task performance information and, as suitable, halts performance of a work project until supervisory intervention or input occurs. The work support tool 23, most preferably, determines if a precedent task must be performed before another task can be performed. If yes, then the tool 23 prevents the user from performing a new task until the previous one is completed, and preferably completed correctly.

In a preferred embodiment, the work support tool 23 utilizes a relational database or a hierarchical data structure, such as a tree or more generally a graph, as a data structure to determine the sequence of tasks to be performed. The work tool 23 directs the worker to perform a task, based on the worker's success or failure in completing previous tasks. For example, in the hierarchical data structure, each node on the tree defines a task to be performed and each outcome of the task is a branch from the node to other nodes (tasks). Each node also contains information about the worker who performed the task, and when and if there were any relevant notes or comments provided previously from a remote module. In a further preferred embodiment, nodes contain website addresses or URLs that refer the user to additional educational and training information.

Thus, the work support tool 23 causes a worker to conduct a series of directed tasks. In the event the tool 23 determines that the worker failed to satisfy a single requirement of a task, the tool 23 may prevent the worker from continuing to work on the project until the task is performed correctly.

As a worker performs the tasks directed by the work support module 23, the module 23 further requires that the worker provide task performance input representative of the actions the worker took in performing a directed task for collection by the system 10. The monitoring tool 25 stores in its memory the task performance input as activity data. For example, the worker can provide input as to whether a certain precondition, such as the existence of a required signature, has been satisfied. In addition, the worker can report on what were his findings for a directed task requiring that the worker make some form of a determination, such as whether there is an exception to the requirement that the signature be obtained and what is the nature of the exception that permits the work project to continue. The monitoring tool 25 stores activity data representative of the task performance input, most preferably, in the form of an activity trail of what tasks were performed and whether they were performed successfully.

In a preferred embodiment, the work module 14 is a computer or hand-held device and the monitoring tool 25 includes a conventional microphone and recording device, as known in the art, that records notes that a worker dictates about the work performed, such as, reasons for the deficiencies. In this embodiment, the worker can later use the tool 25 to access the notes and transform them to an electronic data form suitable for storage at the tool 25, and ultimately cause this data to be stored in the tool 25 as activity data representative of the tasks performed. Alternatively, the tool 25 of the work module 14 includes suitable voice recognition and alphanumeric typing capabilities to permit automatic recording of a worker's notes as alphanumeric data ready for display at the module 14, storage at the tool 25 as activity data and also transmission to the module 12.

In a further preferred embodiment, the monitoring tool 25 can be coupled to computer-controlled machinery which has data output capabilities and which the worker must operate to complete a task directed by the system 10. The machinery preferably generates data representative of the steps the worker performs in operating the machinery and the tool 25 receives this data over a hardwire or wireless connection.

The tool 25 transmits the activity data to the remote module 12 to provide that a supervisor, who would interface with the module 12 at a location remote from the module 14, can learn of the worker's deficiencies and the tasks that need to be performed or corrected. The tool 25 preferably stores activity data with a time stamp, a worker's system identification ("ID") number and also the system ID number of any person making a change to the activity data. As described below, the activity data and other system data can be accessed, edited and viewed only by authorized individuals based on system access restrictions established at the remote module 12.

The tool 25 also provides that selected portions of the activity data may be displayed to the worker to alert the worker, for example, that a task was performed improperly or properly.

In a further embodiment, the monitoring tool 25 stores activity data representative of the education and training information that a worker accesses from the CAL tool 21 or the information module 16. In addition, the monitoring tool 25 stores activity data representative of any test scores that result when a worker completes an education and training unit which the CAL tool 21 or information module 16 may offer and which includes a test to evaluate the worker's comprehension of the information provided.

In accordance with the present invention, a worker with a question as to why a task needs to be completed uses the work support tool 23 to query the information resources of the system 10 at any time simply by accessing the CAL tool 21. For example, if the worker desires to obtain information about the reason why a certain task must be performed before attempting to perform the task, the worker, through the work support tool 23, can link to the CAL tool 21 and also to the information module 16 through the CAL tool 21.

It is known that in some workplace projects, certain tasks to be completed by a worker may require verification or authorization by a higher-level supervisor. In a preferred embodiment, if the worker reaches a pre-defined, critical task requiring an important decision to be made as to what operation must be performed, the tool 23 restricts the worker's performance of the task and automatically transmits an electronic message to the remote module 12. The message is displayed to a supervisor at the remote module 12 and the supervisor is requested to confirm, by sending a responsive electronic message to the work module 14, that the worker has made the correct decision prior to an action being taken. This supervisor messaging may be performed in real time or at predefined intervals, as suitable.

In another embodiment, the monitoring tool 25 stores activity data representative of a worker's failure to conduct a task or incorrect decision. The tool 25 reports activity data of tasks completed to a supervisor at a remote module, with the particular task highlighted or flagged. In a preferred embodiment, when the work tool 23 detects a discrepancy between the operation performed for a specific task and the expected operation to be performed, the tool 23 transmits an automatic e-mail notification or other communication from the module 14 to a remote module to notify a pre-selected person, such as a supervisor or manager, responsible for overseeing the work project.

In still another preferred embodiment, if a future task of a work project must be performed because a specific task had been performed previously, the tool 23 automatically notifies the worker to perform the task at the future date, for example, as part of a task list provided to the worker on that day. Thus, the tool 23 automatically reminds the worker to complete a task depending on previously performed tasks.

In a preferred embodiment, the work support tool 23 electronically transmits the activity trail of a specific worker to designated supervisors on a predefined schedule. In a further preferred embodiment in which the system 10 utilizes a two or three tier architecture, activity trail information for specific workers is made available on a central remote server accessible by duly authorized individuals. A supervisor, thus, can with relative ease, from a remote location, obtain an overview of activities of each worker and what key deficiencies need to be corrected.

In a further embodiment, the user of the work module 14 may be a supervisor who is responsible to evaluate the tasks performed by another person, such as a worker or a lower level supervisor. The supervisor may use the work module 14 to retrieve activity data stored in the monitoring tool 25 and determine, for a particular project, whether all of the tasks have been performed, whether they have been performed correctly or not and the identity of the person(s) who performed or attempted to perform particular tasks. The work support tool 23 in addition permits the supervisor to perform the tasks that the worker is required to perform, unless, of course, the tool 23 determines that the supervisor failed to perform the tasks correctly.

Referring to FIG. 1, the remote module 12 includes a system administration tool 27 that controls system access and usage by individuals and the data processing, storage and transfer operations performed at the modules 12, 14, 16 and other similar modules that may be added to the system 10, as the need arises. The tool 27 permits a system administrator to identify those individuals authorized to access the system and to designate the levels of system access available for the respective authorized users, such as workers, supervisors or others.

In a further preferred embodiment, the system tool 27 can be used to authorize the following system users and levels of system access. A system developer would have complete access to the system functions and debugging information. A system administrator, preferably one or two designated persons for each remote module or work project, would be able to authorize users, configure the system and perform system maintenance. The system administrators would have appropriate read, write and configure system privileges. A supervisor or manager would be able to review and modify the tasks to be performed and review how well the worker performed the tasks, and would have appropriate read and write system privileges. A worker, who is taught and guided to perform directed tasks, would be the primary user of the system and would have appropriate read and write system privileges. In addition, the system 10 can include custom groups having appropriate system access rights established by the system administrator.

In addition, the tool 27 permits the system administrator to schedule and modify the tasks to be performed by workers, including all associated attributes such as prerequisites, outcomes, durations, reference links, due date, etc. In a preferred embodiment, a tree based data structure is used to define the tasks and associations and attributes of tasks.

In a further embodiment, the system tool 27 permits that predetermined timelines of work projects being implemented at a work module may be overridden or reset, preferably in real time. Ease of adaptability and real time modification of the tasks that the work support tool 23 directs the worker to perform are often necessary for a work project because changes in earlier task-linked deadlines in a work project are common.

The remote module 12 further includes an activity evaluation tool 29 that permits a supervisor to generate, view, print and e-mail user-configurable reports which contain and are based on activity data collected at a work module. A supervisor also can utilize the evaluation tool 29 to format reports for export into a WORD document or other suitable format. In a preferred embodiment, the evaluation tool 29 stores activity data representative of all actions undertaken by any worker, manager, supervisor and system administrator authorized to use the system 10 and processes the data to create distinct activity trails. In a preferred embodiment, the evaluation tool 29 monitors all system logins and additions, deletions and changes to any data stored in the system 10 and stores such system data in its memory as activity data.

Thus, operation of the system 10 generates an activity trail that permits mentoring of a worker with supervision, control and feedback. Whoever has access to the activity data, such as a supervisor who can retrieve and review the activity data at the remote module 12, can instantly determine what tasks a certain worker has performed at a given location and time, and further what tasks remain to be performed by the worker. The remote module 12, preferably, processes the activity data to list separately those deficiencies in the work project that need to be corrected. The remote module 12 is directed to transmit a control message to the work support tool 23 of the module 14 to provide that the deficiencies are displayed to the worker, for example, on a display or using a voice synthesizer at the work module 12, each time that the worker conducting the tasks commences to perform work operations at the module 12. Also, the remote module 12 preferably displays the deficiencies at the remote module 12 each time that a supervisory person accesses a work program implemented by the system 10. The feedback loop, in other words, communication between a worker and supervisor through the work and remote modules, respectively, is an important inventive feature that helps ensure that deficiencies in the worker's performance are corrected and avoided in the future. Hence, worker education and training is furthered more quickly and efficiently. The worker, as well as the supervisor, is informed of the errors or deficiencies in the work performed, preferably in real time, such that the worker learns what directed task was performed incorrectly and what constitutes correct performance of the task.

Figure 2:
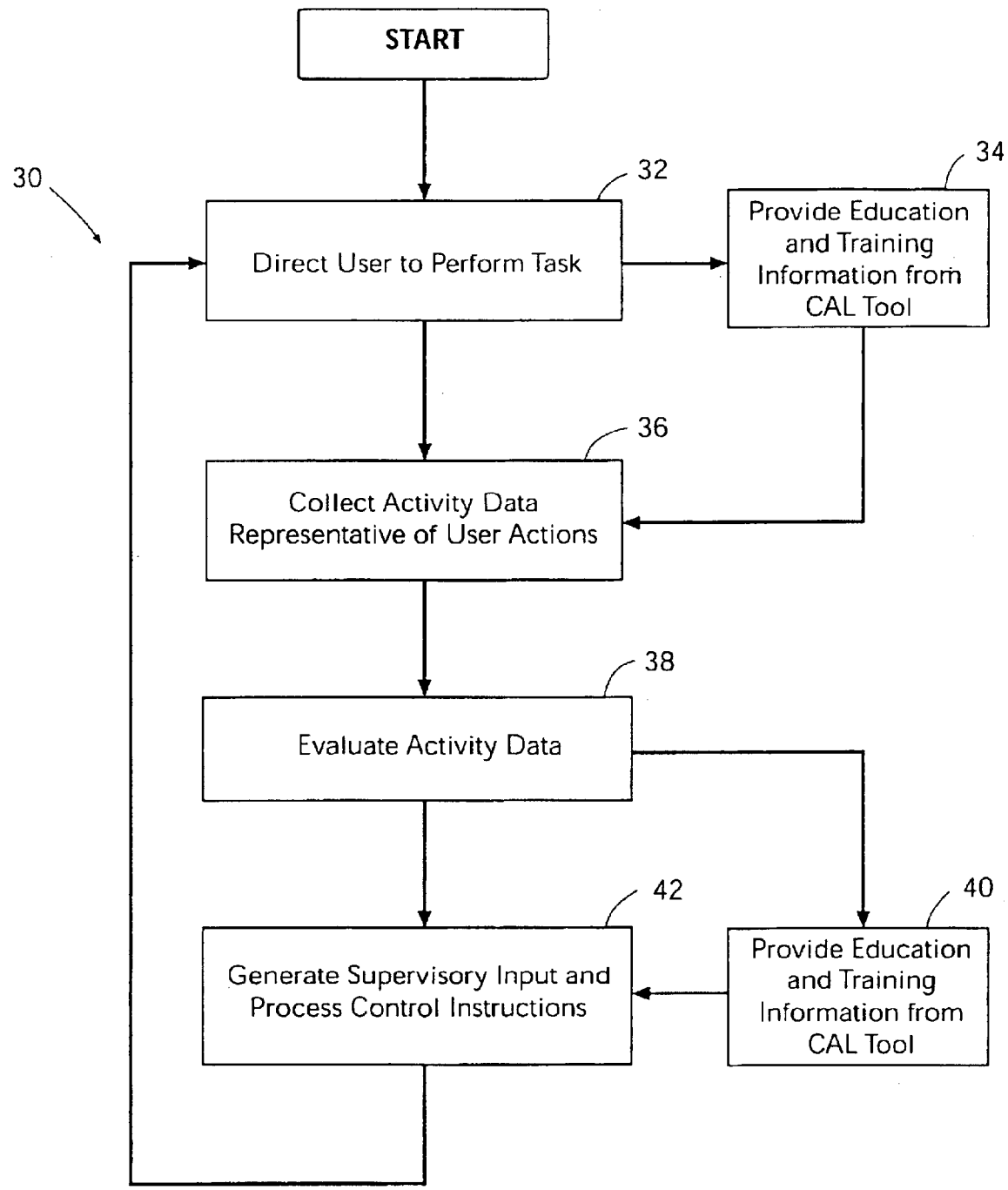
FIG. 2 is a flowchart of implementation of the remote electronic monitoring and mentoring features of the system of FIG. 1 according to one embodiment of the invention.

Referring to FIG. 2, the modules 12, 14 and 16 of the system 10 may be utilized to implement steps of an exemplary computer assisted performance support and remote electronic monitoring and mentoring process 30 that educates a worker on the tasks to be performed, directs the worker to perform the tasks, monitors the worker's performance of the tasks, controls worker performance of the tasks and facilitates the worker's receiving supervisory input from a supervisor based on the performance of the tasks. The process 30 is illustrated below in connection with a physician's clinical study of a new drug. The study requires that a worker follow predetermined regulatory requirements and perform RCS tasks. To perform the clinical study satisfactorily, a participating physician must maintain very detailed records of the results of the study. At the work site, which can be a physician's office, clinic, hospital, etc., a worker is given the task of setting up the study in accordance with federal Food and Drug Administration ("FDA") regulations and following the study protocol and the guidelines for data collection. In many circumstances, a worker assigned to complete the tasks required by the study may not have optimal training and experience to perform the tasks proficiently and accurately. The modules of the system 10 are programmed, in accordance with the present invention, to support and electronically monitor and mentor computer assisted performance of the study by a worker, including the performance of RCS tasks. By utilizing the inventive system 10 as described above, a person lacking optimal education and experience can be directed to set up the study site in accordance with federal regulations by following the instructions directed by the work support tool 23, and access, as necessary, the educational and training information provided by the CAL tool 21 and the information database module 16 to obtain an improved understanding of the reasons that the tasks need to be performed. The monitoring tool 25 at the work module collects activity data representative of the worker actions to automatically generate a performance activity trail. The module 14 automatically transmits the activity data to the module 12 electronically in real time, or at appropriate intervals, such as daily, to update a supervisor located remote from the work site. The supervisor at the module 12, in turn, transmits feedback to the worker at the module 12 as to what corrections in the work may be needed on a daily, or more frequent, schedule. Also, the supervisor transmits task performance control instructions to the module 14 to control the directed tasks that the worker can perform. It is to be understood that the process 30 can be modified as suitable, in accordance with present inventive technique, for use in connection with other work projects including RCS tasks or non-RCS tasks to provide that a worker may receive supervisory input based on monitoring of performed tasks.

Referring to FIG. 2, in step 32, the work support tool 23 directs the user of the system 10, which for purposes of illustration is a worker, to perform a specified task of a work project. The exemplary task is that the worker needs to confirm that informed consent of a proper subject has been obtained, for example, that the subject signed the consent and is a proper subject for the study.

If the worker does not know whether the person who signed the report is a proper subject, or why a signature is necessary, the worker in step 34 accesses the CAL tool 21 to obtain information explaining the criteria for a proper subject. By accessing the CAL tool 21, the worker can link to the information module 16 to obtain additional training materials on the task to be performed. The training materials in the module 16 would operate to educate the worker on how to quickly recognize a proper subject in the future. The training materials at the module 16 may include a test that the worker must take on the CAL tool 21 after completing a training exercise. The CAL tool 21 stores the results of the test in its memory together with the worker's system ID.

Once the worker receives the educational and training information in step 34, or after step 32, the worker performs the directed task by examining the report. In step 36, the performance task input, namely, the details of the task performed, is collected at the module 14. For example, the worker may speak into a microphone of the module 14, which is coupled to voice recognition hardware and software in the tool 23, and state that there is no name signed and, therefore, no identifying characteristics of a subject (person) who signed the report. The monitoring tool 25 stores activity data representative of the performance task input and then transmits the activity data to the remote module 12. In addition, the monitoring tool 25 in step 36 stores as activity data the results of any training test the worker completed, such as in step 34, and transmits this activity data to the remote module 12 to permit evaluation by a supervisor and supervisory feedback.

In step 38, the activity data is evaluated at the module 14 and also optionally at the module 12 to determine whether the worker performed the directed task and if it was performed correctly. The tool 23, in the illustrated example, would determine that no one has signed the report, and hence display to the worker on the display of the module 14 the following message: "Site cannot initiate, get approvals first".

In step 40, the CAL tool 21 is automatically activated because the directed task was not completed correctly. The CAL tool 21 displays on the module 14 the reason why a certain signature is needed, for example, "FDA requirement." Also, the CAL tool 21 may display an education reference, such as a section of the Code of Federal Regulations, and potential additional educational and training references that the worker can access.

In step 42, the worker receives supervisory input generated at at least one of the remote module 12 and the worker module 14. The work tool 23, having activity data processing capabilities, preferably does not permit further action by the worker until the task is completed satisfactorily. At the remote module 12, a supervisor evaluates the performance task input included in the activity data using the evaluation tool 29. The supervisor generates a message and then transmits it to the work module 14, which ultimately displays the message to the worker. The supervisor's message explains why the task needs to be completed in a certain manner and why the project cannot continue without proper completion of the task. In addition, the supervisor transmits electronic control signals to the work support tool 23 to prevent the worker from performing other subsequent directed tasks until the present directed task is completed correctly.

The performance of the work project in accordance with steps of the process 30 is repeated for each task of the work project with the worker performing the education steps 34 and 40, and the supervisor providing supervisory input and process control instructions in step 42, as necessary.

Thus, the inventive system 10 integrates computer assisted performance support involving education and training with remote electronic monitoring to lead a worker through the tasks that must be performed, including the successful completion of RCS tasks, and to maintain an activity trail of what the worker has done. The activity data collected by the system 10 is used to guide the worker at each step of a series of directed tasks that the work module 14 directs the worker to perform. The work support tool 23 directs the worker how to perform a task and controls the performance of tasks. The CAL tool 21 provides educational information. The remote module 12 provides supervisory and decision-making input based on the performance task input collected by the monitoring tool 25. As a result, the system 10 provides the worker with on-the-job supervision and mentoring. Importantly, the worker's activities are preferably automatically reported to a designated supervisor, who is normally located remote from the work site, and the worker can receive feedback from the supervisor in real time, or at appropriate intervals. Hence, the inventive system causes the worker to receive the benefits of a supervisor's judgment and decision-making while the worker is performing the required tasks. The feedback that electronic mentoring provides to the worker, which is based on monitoring of the skills development of each worker, provides for accelerated learning of RCS tasks that the worker needs to perform daily. With continued performance of tasks under the inventive mentoring system, the worker becomes more skilled and hence more proficient.

In a further embodiment, the invention may be applied to other workers who must perform RCS tasks on a daily basis, such as, for example, help desk personnel who must follow complex questions and find answers, production workers performing well-prescribed tasks, evaluators of regulated work projects following complex guidelines, etc.

In still a further embodiment, the performance of RCS tasks by a worker according to well-constructed rules, and with supervision and supervisor feedback, can be enhanced with artificial intelligence tools, such as rules-based expert systems or neural networks. With such advanced systems, very complex, non-routine tasks or decision-making algorithms, such as deterministic and heuristic algorithms, may be incorporated into the system.

In a further embodiment, the inventive system may include a neural net-based architecture, such as described in U.S. Pat. Nos. 5,630,020, 5,867,799, 5,963,663 and 6,112,304, incorporated by reference herein, that permits the system to learn and, hence, avoids the need for extensive configuration and re-configuration of system software each time that a work task needs to be modified. This embodiment permits knowledge acquisition, accumulation and synthesis to make the system self-improving.

Although preferred embodiments of the present invention have been described and illustrated, it will be apparent to those skilled in the art that various modifications may be made without departing from the principles of the invention.

What is claimed is:

1. A method for electronic mentoring of computer assisted performance support comprising the steps of:

identifying directed tasks to be performed;

collecting at a work data processing, storage and transfer module activity data representative of performance of each of the directed tasks;

storing the activity data to permit retrieval from a remote data processing, storage and transfer module; and providing for generation of performance feedback at the remote module and transmission of the feedback to the work module.

2. The method of claim 1 further comprising the step of:

transmitting the activity data to the remote module.

3. The method of claim 2, wherein the transmitting of the activity data is performed in real time.

4. The method of claim 2 further comprising the step of:

transmitting the feedback to the work module in real time.

5. The method of claim 1, wherein the feedback includes at least one of supervisory input and task performance control instructions.

6. The method of claim 1 further comprising the step:

controlling whether the directed tasks can continue to be performed based on an evaluation of the activity data.

7. The method of claim 6, wherein the controlling is initiated at the remote module.

8. The method of claim 6, wherein the controlling is initiated at the work module.

9. The method of claim 1 wherein the identifying step further comprises:

identifying a sequence of directed tasks and dependencies between the tasks to be performed.

10. The method of claim 1 further comprising the step of:

providing an educational and training information database, wherein at least one of the directed tasks is linked to information contained in the database.

11. The method of claim 10, wherein the information database can be accessed from the work module at any time.

12. A method for electronic mentoring of computer assisted performance support comprising the steps of:

providing an educational and training information database;

providing a work data processing, storage and transfer module for educating, directing and controlling action of a user of the work module;

storing in a monitoring database activity data representative of actions taken by the user;

providing for transmission of the activity data from the monitoring database to a remote data processing, storage and transfer module; and providing for reception at the work module of feedback transmitted from the remote module and generated based on an evaluation of the activity data.

13. The method of claim 12 further comprising the step of:

storing data representative of the user's accessing the information database as the activity data.

14. The method of claim 12 further comprising the step of:

storing data representative of test results obtained based on the user's accessing the information database as the activity data.

15. The method of claim 12 further comprising the step of:

controlling action of the user based on evaluation of the activity data at at least one of the work module and the remote module.

16. The method of claim 12, wherein the activity data and the feedback are transmitted in real time.

17. A system for electronic mentoring of computer assisted performance support comprising:

a work data processing, storage and transfer module including a work support tool and an education and training information tool, wherein the work support tool directs and controls tasks to be performed by a user;

wherein the work module includes a monitoring tool for collecting activity data representative of the user's actions and for transmitting the activity data to a remote data processing, storage and transfer module, wherein the remote module includes an activity evaluation tool for generating and transmitting feedback, and wherein the work support tool receives and displays to the user the feedback transmitted from the remote module.

18. The system of claim 17, wherein the monitoring tool transmits the activity data to the remote module in real time.

19. The system of claim 17, wherein the monitoring tool stores data representative of the user's utilization of the information tool as the activity data.

20. The system of claim 17, wherein the work module controls the tasks to be performed by the user after evaluating the activity data.

21. The system of claim 17, where the feedback includes at least one of supervisory input and task performance control instructions.

22. The system of claim 17, wherein the work module controls the tasks to be performed by the user based on the task performance control instructions.

23. A system for electronic mentoring of computer assisted performance support comprising:

a central data processing, storage and transfer module for identifying directed tasks to be performed at a work module;

collecting activity data representative of performance of each of the directed tasks, and storing the activity data at the central module, wherein the central module is adapted to permit retrieval of the activity data by a remote module, receipt of feedback generated at, and transmitted to the central module from, the remote module and the transmission of the feedback to the work module.

* * * * *